United States Patent [19]
Wente et al.

[11] Patent Number: 5,737,073
[45] Date of Patent: Apr. 7, 1998

[54] DEVICE AND PROCESS FOR MEASURING THE POSITION OF A FIRST AXIS IN RELATION TO A SECOND AXIS, IN PARTICULAR FOR MEASURING A STEERING AXIS

[75] Inventors: Holger Wente, Braunschweig; Bernd Scheibner, Cremlingen; Ullrich Thiedig; Bernd Koester, both of Brauschweig, all of Germany

[73] Assignee: Schiebner Messtechnik, Braunschweig, Germany

[21] Appl. No.: 528,880

[22] Filed: Sep. 15, 1995

[30] Foreign Application Priority Data

Sep. 15, 1994 [DE] Germany ............... 44 32 828.1

[51] Int. Cl.$^6$ ............... G01B 11/26; G01B 5/24
[52] U.S. Cl. ............... 356/139.09; 356/139.03; 33/288; 33/608
[58] Field of Search ............... 356/139.03, 139.09; 33/288, 608

[56] References Cited

U.S. PATENT DOCUMENTS

| | | | |
|---|---|---|---|
| 4,015,339 | 4/1977 | Horvallius | 33/288 |
| 4,432,144 | 2/1984 | Carlsson | 33/180 AT |
| 4,889,425 | 12/1989 | Edwards et al. | 356/152 |

*Primary Examiner*—Mark Hellner
*Attorney, Agent, or Firm*—Foley & Lardner

[57] ABSTRACT

The invention relates to a device and a process for measuring the position of a first axis in relation to a second axis, in particular for measuring a bicycle frame having a steering axis which, in the desired state, lies in a main plane of symmetry and has a second axis which, in the desired state, runs at right angles to the main plane of symmetry, for example a swinging arm axis or a bottom bracket axis of a bicycle frame. The device or process includes measuring bodies being fitted to the first axis to be measured and two image recording devices, in particular CCD cameras, which are spaced apart from each other in a fixed spatial relationship to the second axis and aligned with the measuring bodies. The evaluation is carried out by means of known methods of photogrammetry and a computing unit.

21 Claims, 9 Drawing Sheets

5,737,073

DEVICE AND PROCESS FOR MEASURING THE POSITION OF A FIRST AXIS IN RELATION TO A SECOND AXIS, IN PARTICULAR FOR MEASURING A STEERING AXIS

FIELD OF THE INVENTION

The invention relates to a device and a process for measuring the position of a first axis in relation to a second axis. Both the device and the process are in particularly suitable for measuring a bicycle frame which has a steering axis which, in the desired state, lies in a main plane of symmetry, and an axis which, in the desired state, runs at right angles to the main plane of symmetry, for example a swinging arm axis or a bottom bracket axis. The device and the process are particularly suitable for checking the dimensional stability of the frame of motorcycles which have been in an accident. The use of the process according to the invention and of the device according to the invention is not restricted to these cases, however. Rather the device and the process can be applied wherever two axes run skew in relation to each other and the relative position of the two axes to each other is a precondition for the functioning of the technical device of which they are part. Examples of this are aircraft undercarriages, production installations having pivotable parts, and the like.

BACKGROUND OF THE INVENTION

A typical object to be measured is shown in FIG. 1. The object shown in FIG. 1 is a motorcycle frame 10 which is constructed in the conventional manner as a tube loop frame having two lower tubes 12R and 12L. The lower tubes 12L and 12R form with a steering head tube 14 and a main tube 16 a three dimensional framework which, apart from supporting a motor, has the primary task of producing a torsionally stiff connection between a steering head axis 21 and a swinging arm axis 22 running through a swinging arm bearing 20. The steering head axis 21 is, by definition, a "first axis", the swinging arm axis 22 is, by definition, a "second axis", the in the sense of this invention.

In the desired state, the steering axis 21 lies in a main plane of symmetry 24 of the frame, while the swinging arm axis 22 is at right angles to the main plane of symmetry 24. The relative position of the first axis 21 and the second axis 22 to each other may be described, for example, in a cartesian coordinate system which contains the swinging arm axis 22 as the X-axis, while the Y- and Z-axis cover the plane of symmetry 24. However, a multiplicity of coordinate transformations are conceivable, so that the geometry of a motorcycle frame or the position of two technically important axes to each other can also be described in another coordinate system.

FIG. 2 shows a motorcycle frame, shown simplified, in the direction of the X-axis according to FIG. 1, the main tube 16 being shown as connecting the steering head tube 14 to the swinging arm bearing 20.

FIG. 3 shows a top view of the frame shown schematically in FIG. 2, and FIG. 4 shows a front view of the same frame. The variables which are relevant to the assessment of the dimensional stability of a motorcycle frame are the steering head angle α; the frame length, commonly represented by the lengths A and B drawn in FIG. 2; the longitudinal axis offset z, which is drawn in FIG. 3 and in the case of a single track vehicle is 0 in the desired state; and the camber angle β, which is drawn in FIG. 4 and in the case of a single track vehicle, for example a motorcycle, is likewise 0 in the desired state.

These variables are of decisive importance for the driving behaviour of a bicycle, so that a frame to be checked for dimensional stability, for example that of a vehicle which has been in an accident, or a newly produced frame should be measured for these variables.

Various devices have been disclosed for measuring bicycle frames. Thus, German Auslegeschrift 2738609 B1 disclosed a testing and measuring gauge for establishing deformations of the frame of a motorcycle, in which a voluminous and cumbersome framework is firmly screwed to the steering head of the frame and the correct position of the swinging arm axis, that is to say the second axis in the terminology chosen here, is indicated by centering points fastened on the framework. Using this device, it is not possible to measure the extent of deviations in a concrete manner. Furthermore, it is not possible to measure motorcycle frames of the more recent generation, as those do not have a physically constructed steering head but rather as the steering axis, as a virtual axis, is not physically present.

In order to avoid the disadvantages of the known testing and measuring gauge acting as pure exclusion gauge, European Offenlegungsschrift 0491369 A3 proposes a device for measuring a bicycle frame which has a part which can be placed on the steering head and parts which can be placed on each side of the swinging arm mounting, at least one part being connected to an aligning laser which is movably supported. By aligning the visible laser beam on specific targets, for example on centering points fitted to the swinging armbearing, a reference line can be produced on which a distance can be measured. The known device using a laser beam is, however, still subject to the disadvantage that manual measuring operations, in particular distance measurements between two points by means of a tape measure or the like, form part of the measuring process, resulting on the one hand in high measurement inaccuracies and on the other hand awkwardness in handling.

Furthermore, devices and processes are known, operating with the use of laser alignment beams, for measuring motor vehicle bodies which have been in accidents. In such devices and processes use is made of stands, on which a laser device is fastened, and set up around the vehicle to be measured. Such a process is disclosed, for example, in the international application WO 90/10188. In theory, it is also possible with such a method, using known triangulation processes and evaluation methods, to determine the position of a first axis in relation to a second axis, for those of a parked motorcycle. However, in this case this process is subject to the disadvantage that it is very costly and requires a great deal of space. Furthermore, this process cannot be automated.

SUMMARY OF THE INVENTION

The invention is therefore based on the object of providing a device and a process for measuring the Position of a first axis in relation to a second axis, which enable a greater measurement accuracy and a higher operating convenience than previous measurement devices—and processes—are more easily capable of being automated, and are suitable at least as a basis for the measurement of frame constructions without a steering head or other objects to be measured in which at least one of the axes does not physically appear directly, but represents a virtual axis of rotation in space.

To achieve these objects, an embodiment of the invention Comprises at least two markers (measuring bodies) which can be fitted to the object to be measured in a fixed spatial relationship to the first axis;

at least two image recording devices which are spaced apart from each other and in each case generate an image signal;

positioning means to position the image recording devices in a fixed spatial relationship to each other and to the second axis in such a way that the measuring bodies connected directly or indirectly to the first axis are in each case located in the image range (capture range) of at least two image recording devices; and data processing means to determine from the image signals, using photogrammetric calculation methods, the spatial coordinates of the measuring bodies and, from these, the position of the first axis.

With respect to the process, an embodiment of the invention comprises a process for measuring the position of a first axis in relation to a second axis, in particular for measuring a bicycle frame having a steering head axis lying in a main plane of symmetry and having a second axis running at right angles to the main plane of symmetry, for example a swinging arm axis or a bottom bracket axis, having the following steps:

the fitting of at least two markers (measuring bodies) in extension of the first axis (steering head axis), the production of a fixed spatial relationship between at least two image recording devices, the second axis and a stationary coordinate system by means of optical or mechanical positioning means, the calculation of the location vectors of both measuring bodies located on the first axis from the image data from at least two image recording devices by means of photogrammetric calculation methods, and the calculation of the difference vector, lying on the first axis, of the two location vectors.

An essential feature of the invention is thus the use of photogrammetric methods, known per se, for determining the relative position of two axes in relation to each other, which are made identifiable for two image recording devices by means of markers, i.e. measuring bodies, which can be fitted. In this case, the measuring bodies can be passive, that is to say only reflective, or active, that is to say self-illuminating. CCD cameras are particularly suitable as image recording devices on cost grounds, because CCD cameras supply electric signals which can be further processed using conventional methods without problems caused by video signals. The evaluation of the video signals supplied by the two image recording devices is carried out in this arrangement with the aid of known photogrammetric methods, so that the position of the two measuring bodies, fitted in a fixed spatial relationship to the first axis, can be determined in a previously defined cartesian coordinate system. Since the position of the two CCD camera image recording devices, spaced apart from each other, is known in relation to the second axis and thus in relation to the coordinate system, the mutual relative position of the two axes in relation to each other is hence also known.

According to the invention, it is preferable that the positioning means have a mechanical connection which fixes the basic distance between the two image recording devices, the mechanical connection preferably being the main crossbeam of a U-shaped frame, of which the two limbs in each case have an attachment part which can be aligned with the second axis, that is, in the case of a motorcycle frame, the swinging arm axis. Such a configuration makes it possible to produce the defined spatial relationship, envisaged by the invention, between the image recording devices and the second axis, particularly in the case of a motorcycle, in a simple and yet precise manner with little manual intervention. The U-shaped frame, fitted onto and aligned with the swinging arm axis using centering points has, as a last degree of freedom, another rotation about the swinging arm axis which, in respect of the measurement process, is not damaging and can be used for the purpose of bringing the measuring bodies fastened to the first axis into the capture range of the image recording devices. During the actual measuring operation, the U-shaped frame is fixed, for example by means of its own weight, or by means of a transverse strut or the like.

Preferably, both the image recording devices are connected in a fixed angular position to the mechanical connection fixing the basic distance between them, that is to say to the main crossbeam. As a result, it is possible to calibrate the unit comprising image recording devices and mechanical connection, in particular the U-shaped frame.

For this purpose, the U-shaped frame is fastened onto its own jig, provided for this, which contains an axis substituting, for example, a swinging arm axis. At a distance from the substituted swinging arm axis, that is to say the fastening axis of the jig, measuring bodies (fitting bodies) are arranged which have previously been exactly measured using a 3D-coordinate measuring machine. From the image, supplied by the two image recording devices, of the measuring bodies measured in this way, the necessary calculation constants can be calculated backwards, so that the unit formed from the U-shaped frame and integrated image recording devices is constant. If the unit is now used for measurement, the position of the first axis can be calculated by means of known photogrammetric methods from the image of the two measuring bodies, provided that the two markers (measuring bodies) are arranged in extension of the first axis, in particular extending along the steering head axis of a conventional motorcycle frame.

To increase the accuracy, provision can be made for more than two measuring bodies to be arranged on the first axis is and, instead of the difference vector, a vector lying on the axis to be determined by means of an equalization of errors calculation.

However, the previously described process is only suitable for measuring objects in which it is possible to fit two measuring bodies in extension of the first axis. This is not possible, for example, in the case of so-called steering head-less frame constructions in which the front wheel fork of a motorcycle rotates about a virtual axis of rotation which is provided by two spherical joints, but does not exist physically as such. Similar problems are also posed in the case of retractable aircraft undercarriages and the like.

The invention therefore proposes to refine the photogrammetric evaluation and provides a process using a device according to the invention having the following steps:

the fitting of at least two markers (measuring bodies) at a radial distance from the first axis (steering head axis) to a component (handlebar) which can be pivoted about the axis, so that they describe a circle in each case when the handlebar is turned, the production of a fixed spatial relationship between at least two image recording devices, the second axis and a stationary coordinate system by means of optical or mechanical positioning means, the calculation of the location vectors of both measuring bodies in a first position from the image data from at least two image recording devices by means of photogrammetric calculation methods, the pivoting of the handlebar into another position, so that the measuring bodies are moved on a circular arc into another position, the repeated calculation of the location vectors and renewed pivoting until the location vectors and hence the measuring body positions are known in at least three positions, the calculation of the two circles described by the measuring bodies, in each case from three known location vectors, using the means of analytical geometry, the calculation of the centers of the circles, and the calculation of the difference vector, lying on the first axis, of the location vectors of the centers of the circles.

In this arrangement, the process according to the invention assumes that two markers which are fitted at a spatial distance from each other and from the first axis to a component which can be pivoted about the axis are moved on a circular arc when pivoted. If in each case three points of a circular arc are determined by means of photogrammetric methods, the position of the circle is known in the cartesian coordinate system on which the measurement process is based and is defined in relation to the second axis. If the circular arcs are known, the circles themselves and hence their centers can be calculated. The difference vector of the location vectors of the centers of the circles in this case fixes the first axis sought.

The basic idea of the invention may be refined further for the primary purpose of checking a motorcycle frame which has been in an accident for dimensional stability.

Thus, for example, the two image recording devices are connected to the mechanical connection fixing the basic distance between them, for example to the main crossbeam of a U-shaped frame, by means of a pivotable bearing, the pivoting axis of which can for example be at right angles to the basic distance. Such a configuration makes it possible to take into account different frame lengths, so that the capture range, for example of CCD cameras, is matched accordingly.

Furthermore, for simple handling, a measuring body holder can be provided which can be fitted onto the steering head of a bicycle frame and positions at least two measuring bodies in the first axis. In this case, by definition, the first axis is to be understood as the steering axis.

In the case of configuring the mechanical connection in the form of a U-shaped frame, a fitting sleeve can be provided, which can be inserted between the attachment part and the swinging arm bearing, to remove the displaceability of the U-shaped frame in the direction of the X-axis, that is to say in the direction of the swinging arm axis, and hence to fix an unequivocal coordinate system.

In the case of bicycle frames, particularly to be able to determine not only the relative position of the two axes principally measured, but also to be to measure other parts of the frame in relation to a plane of symmetry of the frame such as, for example, engine mountings or the like, provision can be made to support an alignment laser on the main crossbeam of the (measurement) frame, said laser being pivotable about an axis which is parallel to the second axis (swinging arm axis) and covering a reference plane which is parallel to the plane of symmetry of the frame. In this case, the distance of the reference plane covered by the pivotable laser beam in relation to the plane of symmetry can be read by means of measuring means or measuring divisions arranged on the axis.

In the case of a further conceivable embodiment of the invention, the positioning means are not of mechanical design but of optical design. Thus, for example, it can be provided that the positioning means comprise optical guiding means to align the second axis with a fixed spatial relationship to the two image recording devices. Thus, for example, the image recording devices can be positioned essentially parallel to a workshop floor by means of mechanical supporting means in the case of a second axis (swinging arm axis), of the object to be measured in such a way above the workshop floor that the object to be measured, in particular a bicycle, can be parked between said image recording devices, and the optical positioning means can comprise alignment lasers arranged to the right and to the left of the bicycle and arranged in a fixed spatial relationship to the workshop floor and the image recording devices. It is disadvantageous in this embodiment that the often heavy motorcycle or other object to be measured must be aligned, which results in considerable outlay.

As an alternative, it can therefore be provided for optical positioning means to be present in the form of two further image recording devices which are in a fixed spatial relationship to the first image recording devices. In this case, the first image recording devices, as already mentioned, are aligned with the first axis to be measured, while the second image recording devices are aligned with the second axis, that is to say the swinging arm axis. To carry out this variant of the measurement process according to the invention, markers, that is to say measuring bodies, are likewise fitted to the swinging arm axis or in its extension.

The second pair of image recording devices supplies video signals from which the position of the measuring bodies fastened to the second axis and the position of this axis in relation to the second pair of image recording devices can be calculated. Since the second pair of image recording devices is in a fixed spatial relationship to the first pair of image recording devices, a spatially defined coordinate system is thus produced, to which the position of the first axis to be measured can be referred.

Furthermore, according to the invention, provision can of course be made for data obtained in one coordinate system to be converted to another coordinate system.

Thus, for example, provision can be made to convert the measured data to a coordinate system which contains the lower edge of the steering head tube of a known conventional motorcycle frame. In this way, a calculation of the frame lengths or frame height shown at the outset in FIG. 2 is also possible.

BRIEF DESCRIPTION OF THE DRAWINGS

The invention is explained in more detail below, using exemplary embodiments shown in the drawing, in which.

DETAILED DESCRIPTION

Figure 1:
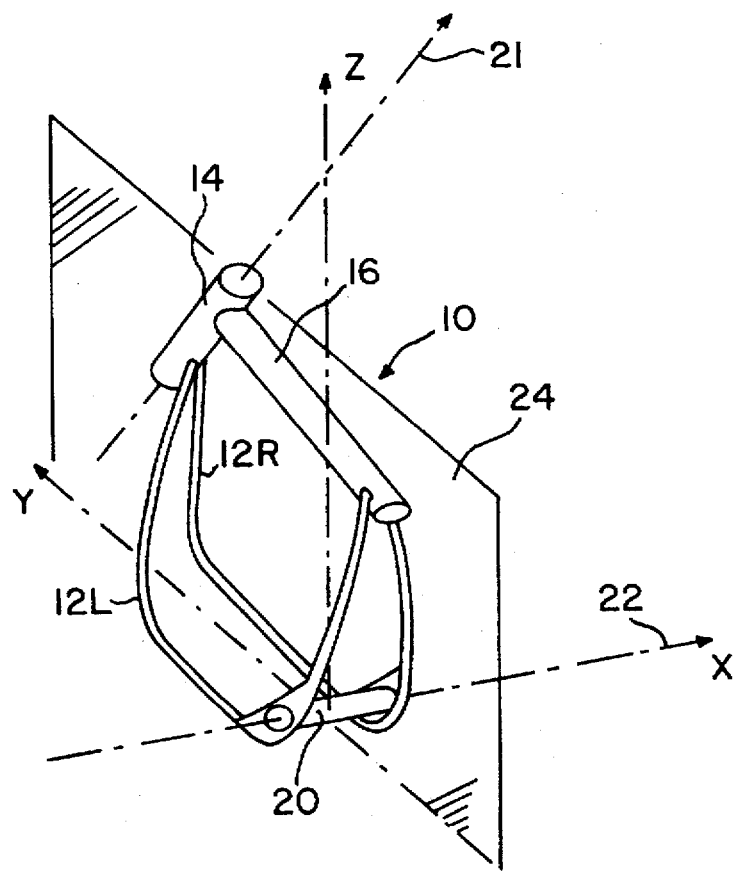
FIG. 1 shows a perspective view of a motorcycle frame with a plane of symmetry running through it and a cartesian coordinate system connected to it.
Figure 2:
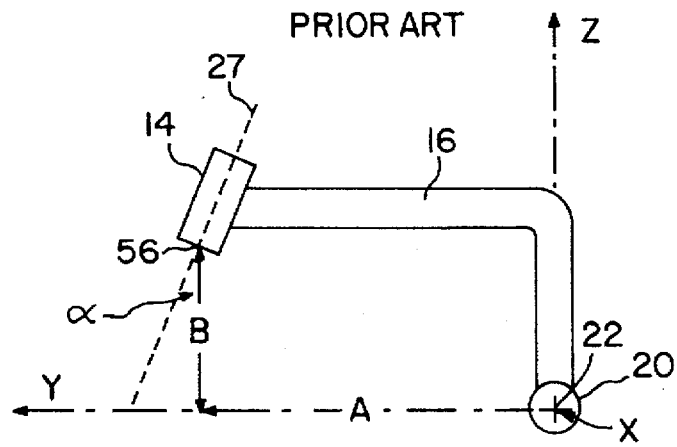
FIG. 2 shows a side view of a motorcycle frame shown schematically.
Figure 3:
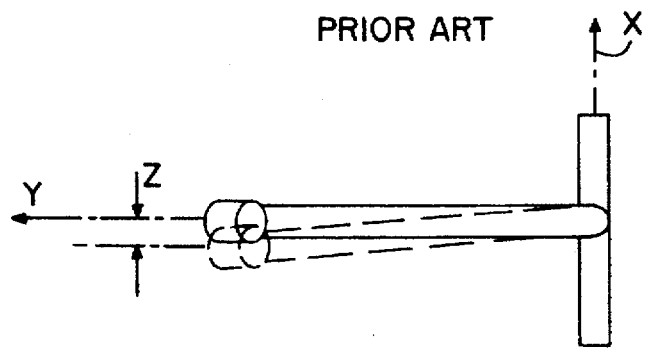
FIG. 3 shows a top view of the motorcycle frame shown in FIG. 2.
Figure 4:
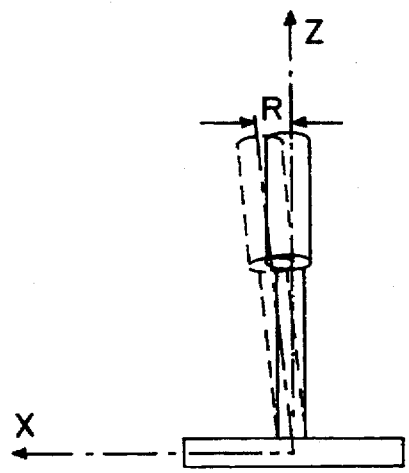
FIG. 4 shows a front view of the motorcycle frame shown in FIG. 2.

FIGS. 1 to 4 have largely been acknowledged during the discussion of the prior art. It should be pointed out once more that the cartesian coordinate system drawn in FIG. 1 in relation to the frame to be measured can also be positioned otherwise, in particular can be displaced along the X-axis. FIGS. 2 to 4 serve essentially to explain the relevant measurement variables for registering the dimensional stability of a bicycle frame. The reference variables or reference lengths "A" and "B" drawn in FIG. 2 are defined in practice such that the path "A" runs horizontally in relation to the highway surface in the case of a motorcycle which is ready to ride and is loaded with a rider having a weight of 75 kg.

Figure 5:
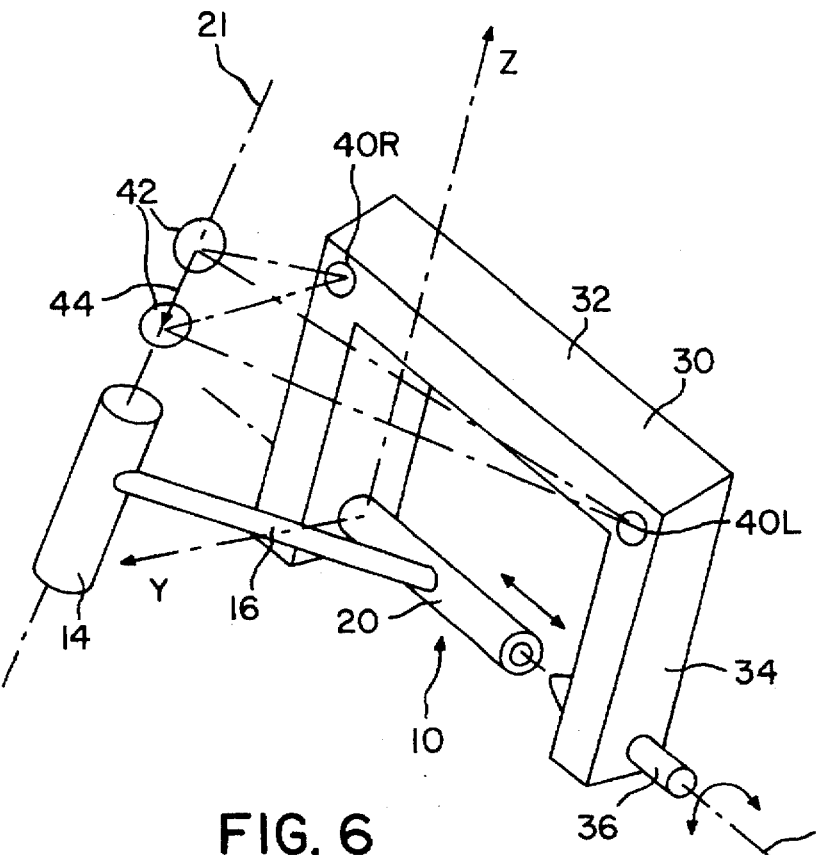
FIG. 5 shows a perspective view of a first embodiment of the invention.
Figure 6:
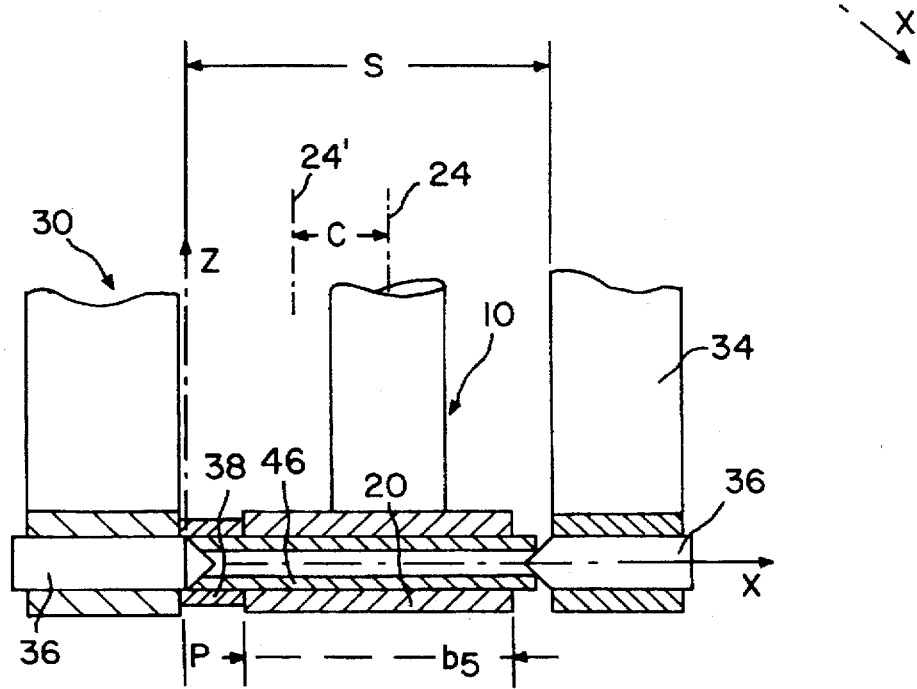
FIG. 6 shows a section in the X-Z plane in FIG. 5.

FIG. 5 shows a perspective schematic representation of a U-shaped measuring frame 30 according to the invention which is fitted on a motorcycle frame 10 to be measured. The measuring frame 30 essentially comprises a main crossbeam 32, from which two limbs 34 extend downward. In the limbs 34, centering points 36 are displaceably supported. The centering points 36 engage in the corresponding holes of the swinging arm bearing 20, so that the U-shaped measuring frame 30 still has two degrees of freedom in relation to the frame 10 to be measured. These degrees of freedom are a rotation about the X-axis and a displacement along the X-axis, as indicated in FIG. 5 by arrows. As FIG. 6 shows, the displacement in the direction of the X-axis can be canceled by using a fitting sleeve 38, so that a defined coordinate system is provided of which the origin is located at the point of intersection between the swinging arm axis and the outer surface of the fitting sleeve. In this way, a defined spatial relationship between the swinging arm bearing 20 of the frame 10 to be measured and the measuring frame 30 is provided. The remaining rotation about the X-axis has a non-critical influence, but during the actual measuring operation the rotation is suppressed by the measuring frame being supported on the rear of the frame of the motorcycle to be measured, for example by means of an additional strut.

CCD image recording devices 40L and 40R are arranged in the two outer ends of the main crossbeam 32. Because of the different viewing angles of the image recording devices 40L and 40R, using the methods of stereometry or photogrammetry, the distance of a point viewed and its position in a known coordinate system can be calculated from the video signals supplied by the image recording devices, presupposing that the fixedly installed CCD image recording devices have previously been measured in relation to the distance lying between them and the angular position, in that a known arrangement of points in a known coordinate system has firstly been measured (use of a so-called jig).

In the calibration of the two CCD image recording devices 40L and 40R, the measuring frame 30 is included in the measurement, so that the information obtained from the evaluation of the video signals supplied by the image recording devices within a specific coordinate system allows the determination of the position of points viewed in a coordinate system associated with the swinging arm axis X.

In order to be able to determine the position of the steering axis 21 in a defined coordinate system, according to the invention at least two measuring bodies 42 are arranged such that their centers are located on the steering axis 21, that is to say on the "first axis" in the terminology chosen here. The measuring bodies are preferably spheres, since these are always imaged as a circle in the case of projection from any arbitrary image angle and for this reason are easy to measure.

As soon as the position of the two measuring bodies 42 and their location vectors in a defined coordinate system are known, by means of photogrammetric determination, by means of forming the difference of these two location vectors, a difference vector 44 which lies on the axis 21 and describes it at the same time can be determined. The difference vector specifies the position of the axis 21, that is to say of a first axis, in relation to a second axis 22 of known position.

It should be pointed out that it is theoretically conceivable to operate with only one CCD camera 40L or 40R which, after a first measurement pass has been carried out, is transferred into the second position. Such an embodiment should be understood as a degraded embodiment in the sense of this invention.

FIG. 6 shows the use of the fitting sleeve 38 according to the invention in order to be able to position the measuring frame 30 or its limbs 34 in a defined manner with a view to a displaceability on the X-axis. By transferring the fitting sleeve 38 into the interspace between the other limb 34 and the swinging bearing 20, a second measuring position is produced which displaces the plane of symmetry 24 of the frame 10 into a second position 24' in relation to the measuring frame 30. For the purpose of a simpler illustration, in FIG. 6 the measuring frame 30 is not drawn in its—displaced—position—resulting from the transferred fitting sleeve 38, but the plane of symmetry 24 is assumed to be lying in the plane of symmetry 24', which represents the same relative offset. The distance which can be determined between the positions of the planes of symmetry 24 and 24' (distance C) can be used in this arrangement for determining the dimension by which the plane of symmetry 24 is separated from the Z-axis in FIG. 6. The width $b_s$ of the swinging arm bearing is specifically yielded as S-2 p-c, where S is the clear swinging arm width and p is the width of the fitting sleeve. The distance of the plane of symmetry 24 from the Z-Y plane drawn in FIG. 6 is then $p+b_s/2$.

To align the centering points 36, an additional centering sleeve 46 can be used, which is pushed into the swinging bearing 20.

Figure 7:
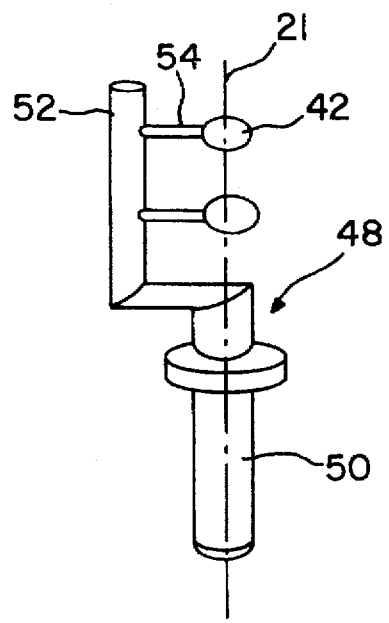
FIG. 7 shows a measuring body holder according to the invention.

FIG. 7 shows a measuring body holder arrangement to be able to position two measuring bodies 42 on one axis 21. The measuring body holder 48 has a centering pin 50 which, for example, can be guided into the inner rings of the steering head bearings of a motorcycle frame. Adjoining the centering pin 50 is an L-shaped holder 52, from which outriggers 54 supporting the measuring bodies 42 project. As FIG. 2 shows, the lengths A and B are characteristic variables for the dimensioning of a motorcycle frame. A knowledge of the position of the point of intersection between the steering axis 21 and the plane of the underside of the steering head tube 14 is necessary for their calculation. A direct measurement of this point of intersection using CCD cameras arranged in a measuring frame 30 according to the invention, and a computer connected downstream for evaluating the video signals supplied, is not possible, since a marker in the form of a measuring body arranged in the point of intersection 56 is not visible to the image recording devices positioned as shown in FIG. 5. In order to be able to measure the position of the point of intersection 56 in the known coordinate system, according to the invention an alternative measuring body holder 58 is proposed for a measuring body 42 positioned on the steering axis 21, that is to say a first axis. This alternative measuring body holder 58 is distinguished in that it has a bearing surface 60 for contact with a lower end face of a steering head tube 14, as well as a centering pin 50 that projects into the steering head, which is not visible in FIG. 8 and is similar to that shown in FIG. 7. The distance between the center of the measuring body 42 and the bearing surface 60 is known as the mounting dimension "a", so that in the case of a known position of the axis 21 and of the dimension a the point of intersection 56 is known. Using this knowledge, the lengths A and B can then be calculated. In an alternative embodiment, it is also conceivable to dispense with the centering pin 50 of the measuring body holder 58. The measuring body 42 used to determine the mounting dimension "a" is not located on the first axis 21 but removed from the latter by an amount which corresponds approximately to half the diameter of the steering head tube. The error caused as a result during the determination of the mounting dimension "a" or during the determination of the point of intersection 56 is negligible.

Figure 8:
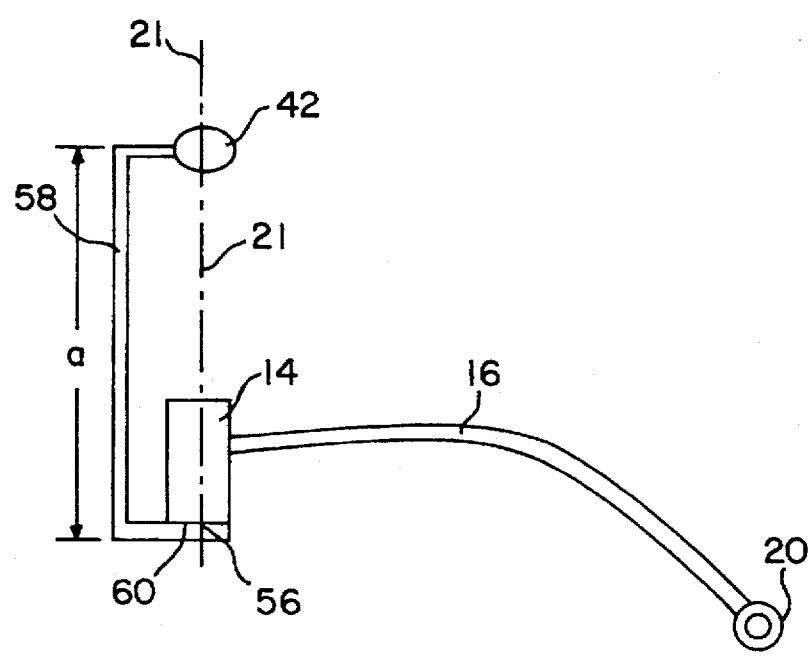
FIG. 8 shows an alternative embodiment of a measuring body holder according to the invention.
Figure 9:
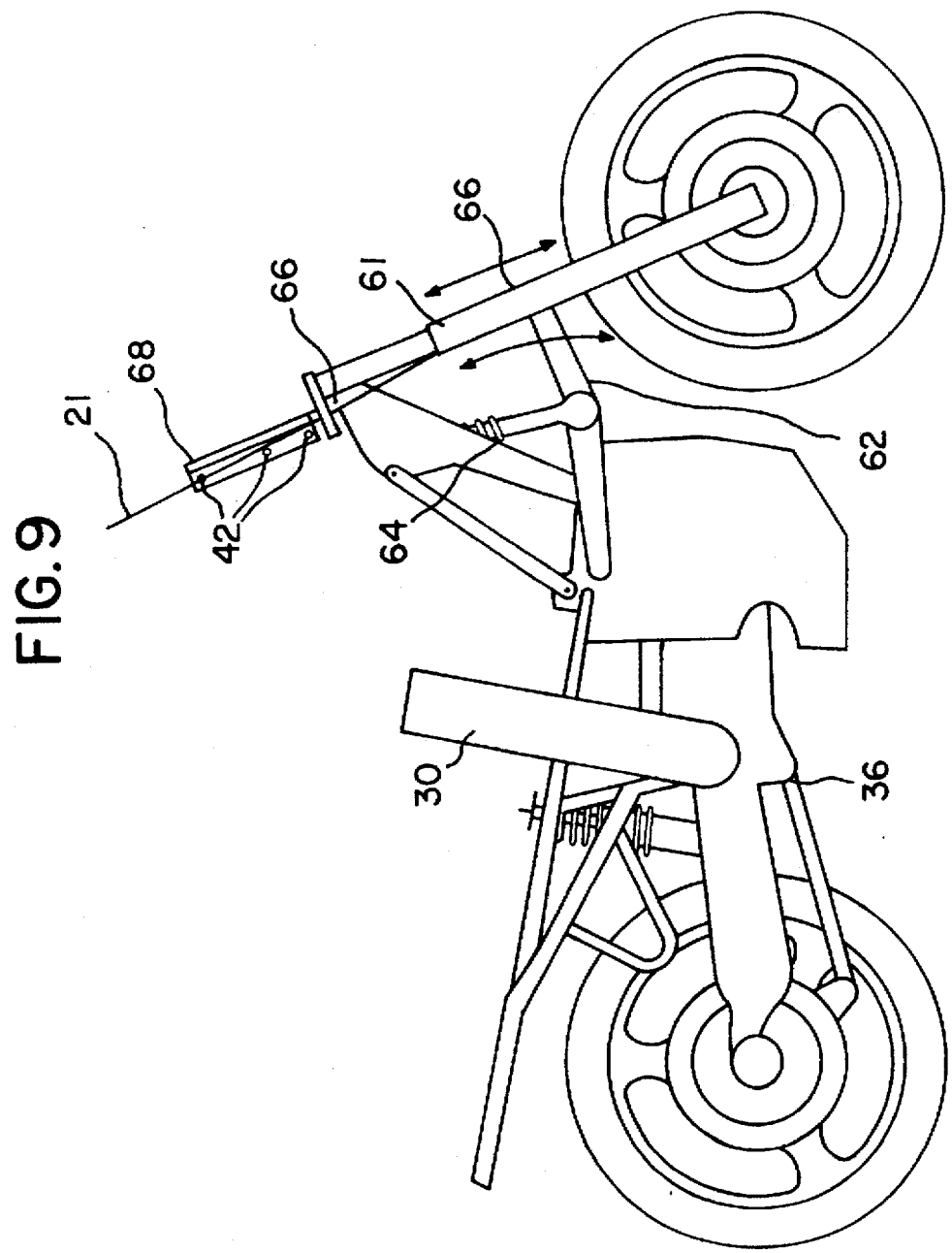
FIG. 9 shows a schematic side view of a motorcycle with a steering head-less frame construction.

FIG. 9 shows schematically the representation of a side view of a motorcycle having a steering headless frame construction. This is to be understood as a frame construction in which, as front wheel suspension, a known telescopic fork 61 is not supported by two conventional fork bridges supported in a steering head tube, but by means of a freely guided swinging arm 62, on which a springing and damping element 64 is supported. The steering axis 21, that is to say the axis around which the frame 10 and front wheel guide 61 are pivotably coupled to each other, is therefore not present as a physically existing axis but is defined only by the position of the two bearings 66. Since there is no steering head tube present, measuring body holders, such as are shown in FIG. 7 and FIG. 8, cannot be used. A known device, such as the applicant has proposed in the prior art, also cannot be used in the case of such a frame construction in order to determine the relevant frame data. Nevertheless, in order to make measurement of the steering axis 21 possible, it is proposed according to the invention to connect a measuring body holder 68, supporting at least two measuring bodies 42, for example to the handlebar or a similar part which is connected to and pivotable together with the front wheel suspension, such that the measuring bodies 42 move on circular arcs when the handlebar or the like is rotated.

Figure 10:
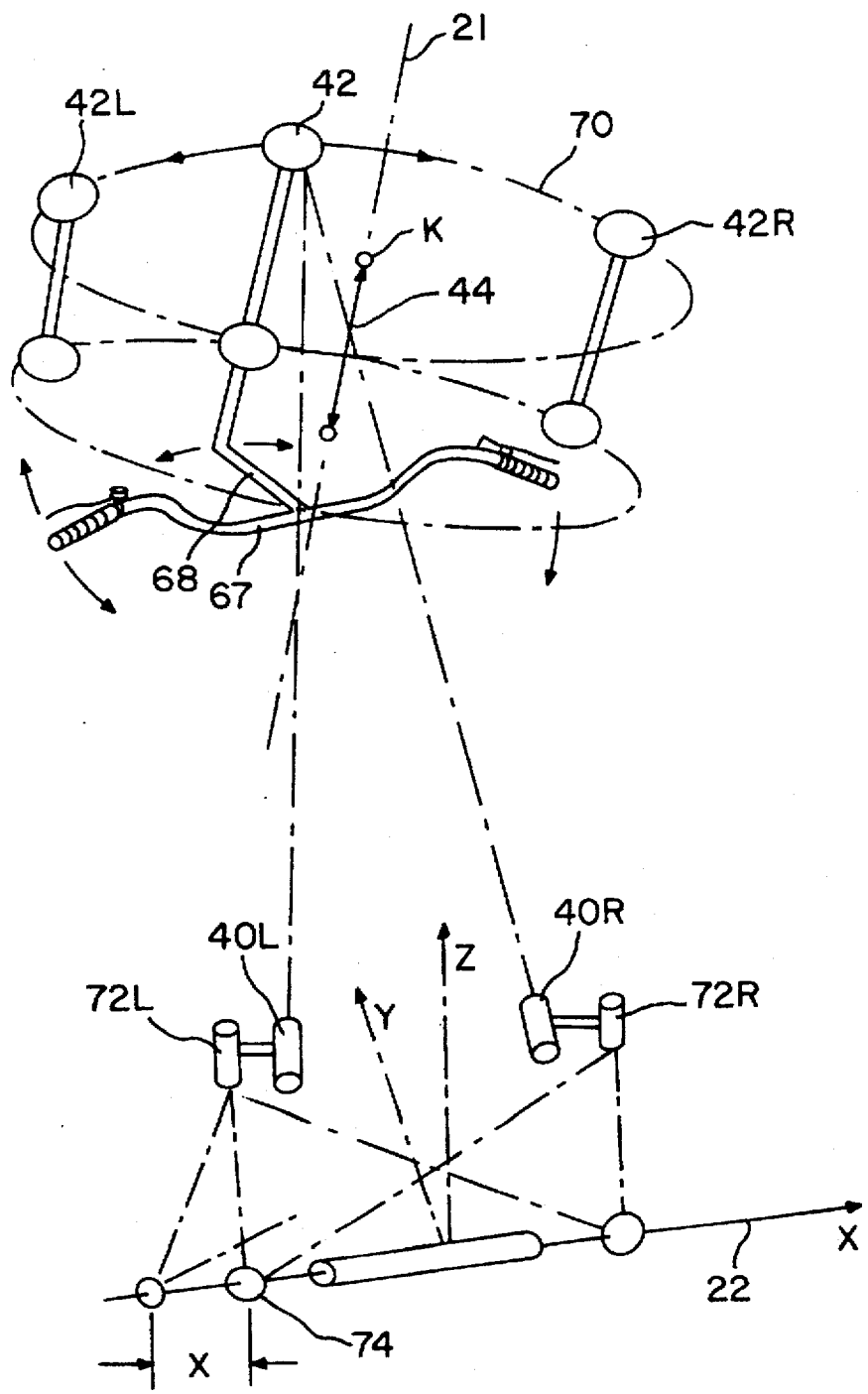
FIG. 10 shows a schematic perspective representation to explain a measurement process according to the invention in accordance with a second embodiment of the invention.

The process used for evaluation is shown schematically in FIG. 10. Fastened to a handlebar 67 of a motorcycle is a measuring body holder 68 which supports two measuring bodies 42 which move on circular arcs as soon as the handlebar 67 is rotated. According to the invention, the measuring bodies 42 are now measured in two additional positions 42R and 42L, so that for each measuring body 42 three positions are known which are known to lie on a circle. Accordingly, the circle as such is defined in the known coordinate system, as is also its center K. The difference vector 44 of the location vectors of the two centers of circles K of the upper and of the lower circle, on which the upper and the lower measuring body 42 respectively moves, defines the steering axis 21. In order to determine the position of the measuring bodies 42 in a known cartesian coordinate system having an X-, Y- and a Z-axis, as shown in FIG. 10, image recording devices 40L and 40R are used, the video signals from which are evaluated in a known way by means of a computer with the aid of photogrammetric methods.

In order to provide the spatial relationship between the two first image recording devices 40L and 40R relative to the second (X-axis) 22, mechanical positioning means in the form of a U-shaped frame can be used, as shown in FIG. 5. Shown in FIG. 10 is an alternative possibility in which optical positioning means in the form of a second pair of image recording devices 72L and 72R are used. These image recording devices are aligned with the second axis 22 and are in each case in a fixed spatial relationship to the first image recording devices 40L and 40R. Arranged on the second axis 22, that is to say on the swinging arm axis of a motorcycle, are measuring bodies 74 which make possible an identification of the second axis 22. The second image recording devices 72L and 72R, positioned in a known spatial relationship to the first image recording devices 40L and 40R, thus make possible an optical positioning of the first image recording devices 40L and 40R in relation to the second axis 22. In order to be able to establish a displacement in the direction of the X-axis and hence the position of the Y-Z plane, two measuring bodies 74 arranged on the axis X can be arranged at a defined distance x from each other.

The process shown schematically in FIG. 10 enables completely automatic measurement of a motorcycle which, for example, is parked between two columns arranged in a workshop, in which in each case a first image recording device 40L, 40R and a second image recording device 72L and 72R are arranged. By means of measuring the second axis by means of the video signals from the second image recording devices 72L and 72R, First the position of the second axis 22 is measured and hence a coordinate system is fixed to which is referred the position of the first axis 21, with which image recording devices 40L and 40R are aligned.

If the process shown schematically in FIG. 10 is used with a mechanical positioning, as shown in FIG. 5, instead of an optical positioning, as shown in the lower part of FIG. 10, a dynamic measurement, that is to say a measurement on the traveling motorcycle, is conceivable. Thus, for example, it is possible to register during driving operation a deformation of the steering head under full braking or steering flutter at high speeds, using high-speed CCD cameras.

Figure 11:
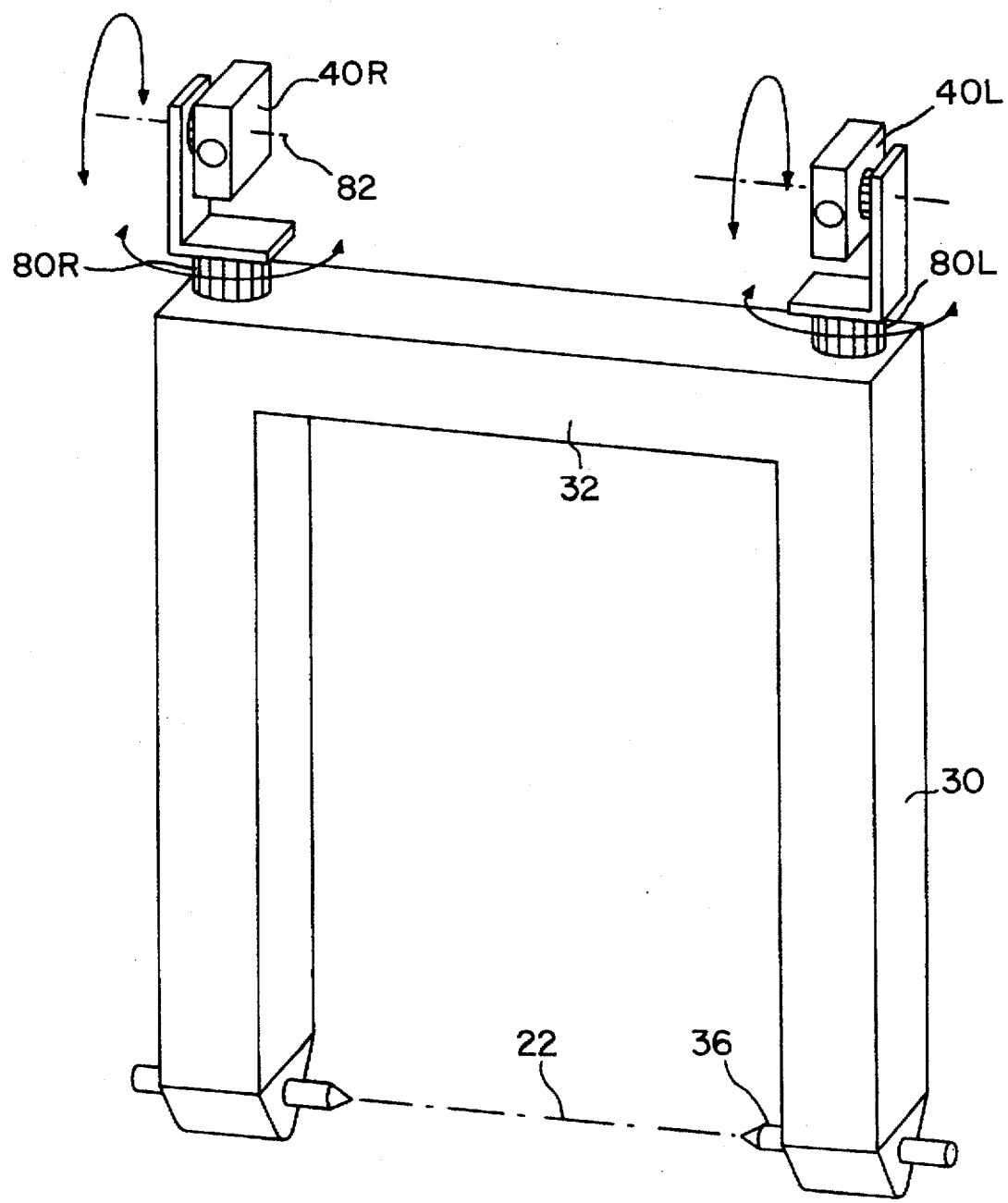
FIG. 11 shows an alternative embodiment of a measuring frame according to the invention.

FIG. 11 shows schematically a U-shaped measuring frame, as also shown in FIG. 5, in which the image recording devices, for example two CCD cameras 40L and 40R, are not mounted in a fixed manner but are arranged on rotary tables 80L and 80R. The rotary tables 80L and 80R allow a pivotability of the CCD cameras 40L and 40R about the main crossbeam 32 and hence on the mechanical connection between their vertical axes of rotation. In this way, it is possible, without transferring the measuring frame 30, to measure points located even in the rear region of the frame, such as for example a rear wheel axis which is guided in a swinging arm. In addition, the rotary tables 80L and 80R can make possible the pivotability of the cameras 40L and 40R about an axis 82 parallel to the mechanical connection 32 (main crossbeam), in order to expand the capture range of the cameras.

Figure 12:
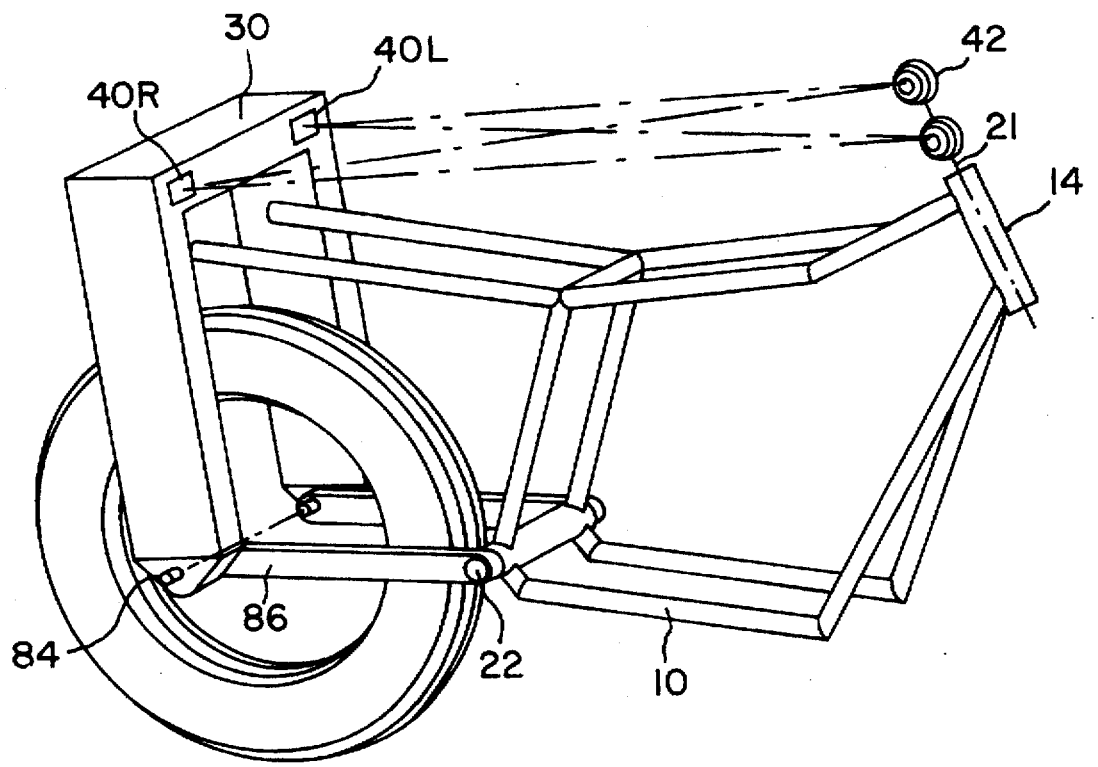
FIG. 12 shows a schematic representation of an alternative possibility for using a measuring frame according to the invention.

FIG. 12 shows an alternative way of using a measuring frame 30 according to the invention having two integrated CCD image recording devices 40L and 40R. Instead of being used on the swinging arm axis 22, the measuring frame is used on a rear wheel axis 84, so that the rear wheel axis becomes the "second axis" in the sense of this invention. In this way, a rear wheel swinging arm 86 and any deformations of the same are also included in the measuring operation.

Figure 13:
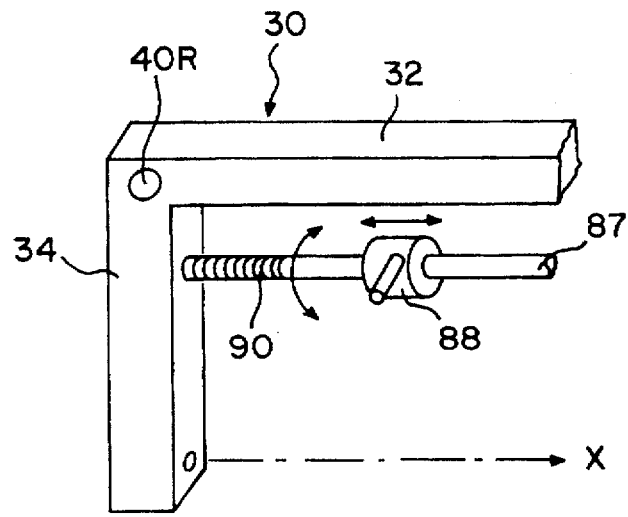
FIG. 13 shows a further embodiment of a measuring frame according to the invention.

FIG. 13 shows an alternative embodiment of a measuring frame 30 according to the invention, in which an additional threaded rod or axis 87 is arranged parallel to the X-axis and hence to the main crossbeam 32 of the frame. An alignment laser 88 is arranged on the X-axis so that it can be moved and pivoted about the axis 87. When pivoted about the axis 87, the beam of the alignment laser 88 covers a plane which is parallel to the plane of symmetry 24 as shown in FIG. 1, the distance of the plane covered from the plane of symmetry 24 being determinable via a measuring scale 90. In this way it becomes possible to measure additional points of the frame.

Figure 14:
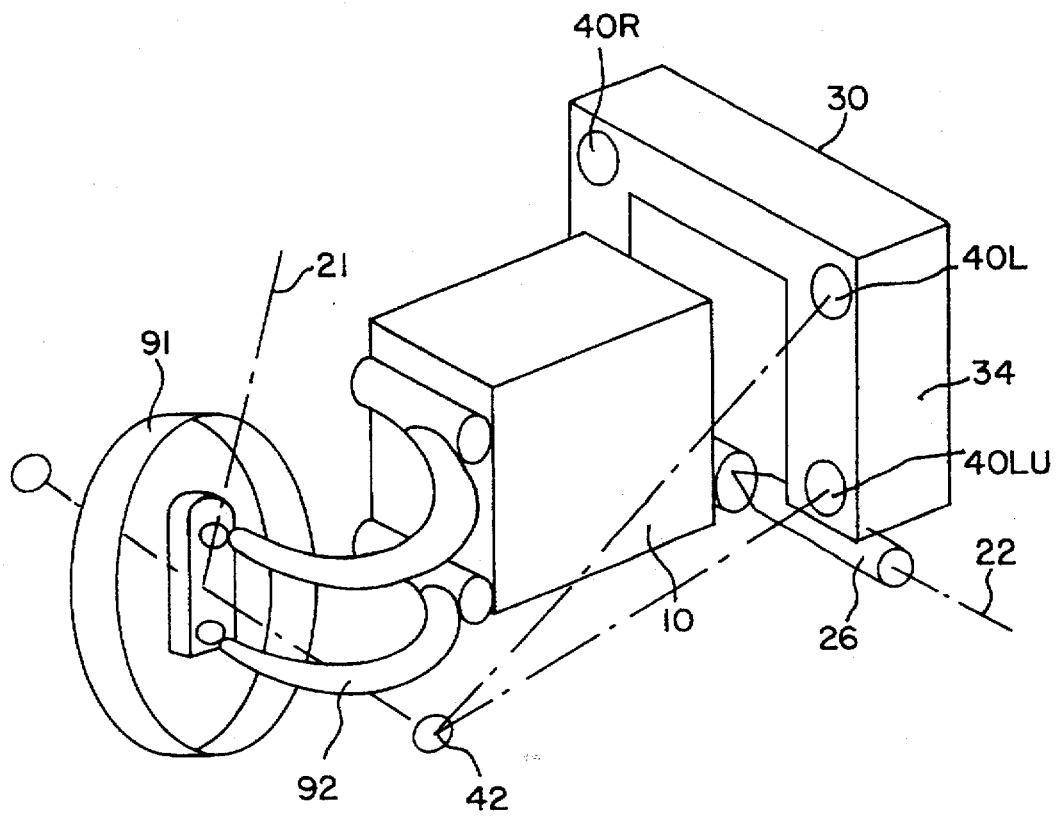
FIG. 14 shows a further modified embodiment of a measuring frame according to the invention, having four image recording devices for measuring a steering knuckle steering system.

FIG. 14 shows a motorcycle frame 10, shown schematically, which has a front wheel suspension for a front wheel 91 in the form of a steering knuckle steering system, which is suspended on swinging arms 92. A measuring frame 30 according to the invention having two image recording devices 40R and 40L is, as explained above, fastened to the swinging arm axis 22 by means of centering pins 26. In the case of a construction as shown in FIG. 14, it is only possible in a very awkward manner to fit measuring bodies 42, which pivot on circular arcs when the front wheel 91 is pivoted, in such a manner that they lie in the image range of the two image recording devices 40R and 40L. According to the invention, it is therefore provided that image recording devices 40LU and—not visible—40RU also be fitted in the limbs 34 of the measuring frame 30, so that measuring bodies 42 arranged to the right and to the left of the steering axis 21 come to lie in each case in the image range of a vertical pair of image recording devices.

By means of further analogous application of the process according to the invention, the measuring bodies 42 are measured in various positions in each case by a pair of image recording devices, so that at least one calculable circle results, at the center K of which circle the steering axis 21 is located vertically.

The device according to the invention and the process according to the invention allow more accurate and more convenient measurement of a bicycle frame than was previously possible. In particular, a further-reaching configuration of the process according to the invention allows the measurement of steering head-less frame constructions and dynamic measurement in driving operation.

What is claimed is:

1. A device for measuring the position of a first axis in relation to a second axis, in particular for measuring a bicycle frame, the first axis lying in a main plane of symmetry, and the second axis running at right angles to the main plane of symmetry, said device comprising:
   at least two measuring bodies each fitted to an object to be measured in a fixed spatial relationship to the first axis;
   at least two image recording devices each adapted to generate an image signal;
   a positioning member for positioning said at least two image recording devices in a fixed spatial relationship to each other and to the second axis so that said at least two measuring bodies are located in an image range of said at least two image recording devices; and
   a data processor for determining from the image signals, using photogrammetric calculation methods, the spatial coordinates of said at least two measuring bodies and, from said spatial coordinates of said at least two measuring bodies, the position of the first axis.

2. A device according to claim 1, wherein said positioning member further comprises a mechanical connection, said at least two image recording devices being mounted to said mechanical connection and being spaced a fixed distance from each other.

3. A device according to claim 2, wherein said positioning member comprises a U-shaped frame having a main crossbeam and two limbs, said main crossbeam serving as said mechanical connection between said at least two image recording devices, each of said two limbs having an attachment part alignable with the second axis.

4. A device according to claim 2, wherein said at least two image recording devices are connected to said mechanical connection in a fixed angular position.

5. A device according to claim 2, wherein said at least two image recording devices are each connected to said mechanical connection by a pivotable bearing.

6. A device according to claim 4, wherein the first axis comprises a steering axis of the bicycle frame, and said device further comprises a measuring body holder adapted to fit onto a steering head of the bicycle frame to position said at least two measuring bodies along the steering axis.

7. A device according to claim 3, further comprising a supporting element that supports said U-shaped frame on the bicycle frame, said U-shaped frame being pivotable about the second axis.

8. A device according to claim 3, wherein the bicycle frame has swinging arm bearing, and said device further comprises a fitting sleeve insertable between said attachment part of one of said two limbs and the swinging arm bearing.

9. A device according to claim 3, further comprising an alignment laser supported on said main crossbeam and pivotable about an axis parallel to the second axis for covering a reference plane, said reference plane being parallel to the main plane of symmetry of the bicycle frame.

10. A device according to claim 3, wherein each said attachment part comprises a centering point.

11. A device according to claim 2, wherein said positioning member comprises optical guiding members to align the second axis in a fixed spatial relationship to said at least two image recording devices.

12. A device according to claim 11 wherein the second axis comprises a swinging arm axis, said at least two image recording devices are positioned by mechanical supporting members apart from each other so that a bicycle can be parked between said at least two image recording devices, said optical guiding members comprise alignment lasers arranged in a fixed spatial relationship to said at least two image recording devices so that said alignment lasers are arranged to the right and to the left of the bicycle.

13. A device according to claim 12, further comprising at least two column-like vertical supports each supporting one of said at least two image recording devices and one of said alignment lasers.

14. A device according to claim 2, further comprising two additional image recording devices arranged in a fixed spatial relationship to said at least two image recording devices and in alignment with the second axis to register the position of the second axis in relation to said at least two image recording devices.

15. A device according to claim 14, further comprising at least two column-like vertical supports each supporting a first image recording device that is aligned with the first axis and a second image recording device that is aligned with the second axis.

16. A process for measuring the position of a first axis in relation to a second axis, in particular for measuring a bicycle frame, the first axis lying in a main plane of symmetry and the second axis running at right angles to the main plane of symmetry, comprising:

fitting at least two measuring bodies along the first axis, producing a fixed spatial relationship between at least two image recording devices, the second axis, and a stationary coordinate system via at least one of optical and mechanical positioning members, calculating a location vector of both measuring bodies along the first axis from image data produced by the at least two image recording devices via photogrammetric calculation methods, calculating a difference vector of the two location vectors, the difference vector lying on the first axis.

17. A process according to claim 16 further comprising providing at least one additional measuring body on the first axis, and calculating a direction vector located on the first axis via an equalization of errors calculation.

18. A process for measuring the position of a first axis in relation to a second axis, in particular for measuring a bicycle frame, the first axis lying in a main plane of symmetry and the second axis running at right angles to the main plane of symmetry, comprising:

fitting at least two measuring bodies at a radial distance from the first axis to a pivotable about the first axis, said measuring bodies describing a circle when the handlebar is pivoted about the first axis, producing a fixed spatial relationship between at least two image recording devices, the second axis, and a stationary coordinate system via at least one of optical and mechanical positioning members, calculating a location vector of both measuring bodies in a first position from image data produced by the at least two image recording devices via photogrammetric calculation methods, pivoting the handlebar into another position, so that the measuring bodies are moved on a circular arc into another position, recalculating the location vectors and repivotting the handlebar until the location vectors are known in at least three positions, calculating at least two circles described by the measuring bodies via analytical geometry, calculating centers of the at least two circles, calculating a difference vector of the centers of the at least two circles, said difference vector lying on the first axis.

19. A process according to claim 16 further comprising transforming the calculated representation of the first axis in a first fixed coordinate system to a second coordinate system containing the second axis as coordinate axis.

20. A process according to claim 18 further comprising transforming the calculated representation of the first axis in a fixed coordinate system to a second coordinate system containing the second axis as a coordinate axis.

21. A device according to claim 1 wherein the first axis comprises a steering axis of the bicycle frame, and the second axis comprises at least one of a swinging arm axis and a bottom bracket axis.

* * * * *